(No Model.)
L. T. SHEFFIELD.
ARTIFICIAL TOOTH.
No. 357,044. Patented Feb. 1, 1887.
Fig. 1.
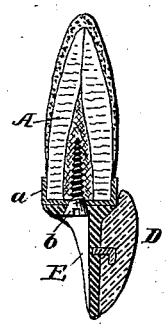
Fig. 2.  Fig. 4.
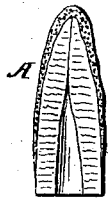  Fig. 3.  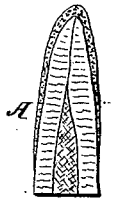  Fig. 5.  Fig. 6.
  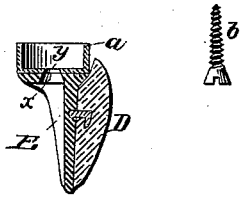
Witnesses:  Inventor:
H. C. Hansmann.  Lucius T. Sheffield,
Wm. G. Sayers.  By Foster & Freeman
  Attorneys

UNITED STATES PATENT OFFICE.

LUCIUS T. SHEFFIELD, OF NEW YORK, N. Y.

ARTIFICIAL TOOTH.

SPECIFICATION forming part of Letters Patent No. 357,044, dated February 1, 1887.

Application filed August 12, 1884. Serial No. 140,356. (No model.)

*To all whom it may concern:*

Be it known that I, LUCIUS T. SHEFFIELD, a citizen of the United States, and a resident of the city, county, and State of New York, have invented certain new and useful Improvements in Artificial Dentures, of which the following is a specification.

My invention relates to that class of artificial dentures in which the supporting block, plate, or bar to which the porcelain teeth are connected is attached to the natural teeth or crowns through the medium of suitable connections; and my invention consists in certain improved means of connection, hereinafter fully set forth, whereby to facilitate the attachment of the parts and insure their secure retention.

In the drawings, Figure 1 is a sectional view through a supporting-roof and artificial denture connected thereto, showing my improvement. Fig. 2 is a section of the root as prepared for the insertion of the filling. Fig. 3 shows the filling-piece. Fig. 4 is a section showing the filling-piece inserted in the root. Fig. 5 is a section of the tooth and cap. Fig. 6 shows the screw.

In carrying out my invention the root or roots A intended to constitute the support for the denture is first prepared by cleaning the cavity and leveling the projecting end in the well-known manner, and a metal cap, *a*, is fitted to the said end, and is perforated for the reception of the connecting-screw *b*.

The filling consists of a block or piece of leather or other fibrous material capable of being condensed in the tooth, as felt or fine cloth. I have found it preferable, however, to use walrus leather, which is cut to fit the root canal or orifice, and then condensed or hardened and introduced into the cavity, so as to completely fill the same, the portion of filling below the prepared face of the root being cut off. When the filling becomes moist, it will swell and fit the orifice so tightly that there is but little danger of its removal. In order, however, to absolutely prevent it from being withdrawn from the orifice, I coat it before its insertion with a suitable cement—as, for instance, oxyphosphate of zinc or bisulphide of carbon or rubber cement.

The artificial denture consists of a backing bar or support, E, of any suitable metal, and the porcelain tooth or teeth D, the said backing having a perforation, *x*, attached to coincide with the perforation *y* in the cap *a*, so that the screw *b* may be passed through the perforations *x* and *y* into the filling, which is first drilled to receive it.

The screw is preferably tapering, and with coarse threads, so as to take firm hold of the filling, and so as to condense the latter as it is introduced, thereby insuring its secure retention and a firm attachment of the denture to the root.

By the use of leather or analogous material capable of being compacted by the tapering screw, and having a long and strong fiber, the screw is held with such firmness in its place that the denture is supported against any strains that may be brought upon it.

The mode of securing the denture above described may be used either in securing a single artificial tooth to the natural root or in securing a more extended structure supporting a number of teeth, and it may be used, in connection with metallic crowns, for supporting the denture at the back of the mouth.

Without limiting myself to the precise construction and arrangement of parts shown, I claim—

1. The within-described improvement in securing artificial teeth to the natural roots, the same consisting in filling the cavity in the natural root with leather or analogous fibrous material capable of being condensed, in capping the root, and then securing the denture to the root by a screw or equivalent entering and condensing the filling, substantially as set forth.

2. The combination of a natural root capped and provided with a filling of leather or equivalent fibrous material, an artificial denture, and a tapering screw extending through the denture and into the filling, substantially as specified.

In testimony whereof I have signed my name to this specification in the presence of two subscribing witnesses.

LUCIUS T. SHEFFIELD.

Witnesses:
GEO. H. EVANS,
F. L. FREEMAN.